United States Patent Office 3,676,204
Patented July 11, 1972

3,676,204
COMPOSITION AND PROCESS FOR GLAZING CERAMIC WARE
Richard Andrew Eppler, Timonium, Md., assignor to SCM Corporation, Cleveland, Ohio
No Drawing. Application May 28, 1969, Ser. No. 828,783, now Patent No. 3,565,644, dated Feb. 23, 1971, which is a continuation-in-part of application Ser. No. 625,000, Mar. 22, 1967. Divided and this application Sept. 25, 1970, Ser. No. 75,710
Int. Cl. C03c 25/00
U.S. Cl. 117—125                                    4 Claims

ABSTRACT OF THE DISCLOSURE

This patent application describes a method and composition for blazing ceramic ware with a high gloss, low expansion glaze, preparations useful for making same, process for glazing bodies and substrates with same, and resulting coated ceramic bodies. The composition for glazing is characterized by containing a particulate vitrifiable material, at least a substantial fraction of which is in the particulate vitreous state, said vitrifiable material, after melting into a fluent vitreous state, being self-nucleating or autocrystallizable or crystallizable into a substantially dimensionally stable continuous vitreous film in which are dispersed crystals of low thermal expansion. The glazing composition is particularly suited for glazing low expansion ceramic whiteware. Set forth as useful preparations are special particulate lithium alumino-silicates modified with flux in proportion controlled to restrict the development of a primary low thermal expansion crystalline phase, some of said preparations being modified with zirconia. The percentage of $B_2O_3$ and $K_2O$ as flux components is critical to the development of high gloss glazes with high ratios of combined $B_2O_3$ and $K_2O$ resulting in high gloss. The glazing process comprises partially coating a ceramic body with the composition for glazing, firing the coated body at a temperature sufficiently high and for a time sufficiently long for converting the composition into a fluent continuous vitreous surface coating, then adjusting the temperature to a value at which crystal growth in the surface coating occurs at a measurable rate, and finally cooling the resultant glazed ware at a rate consistent with keeping the ware integral. The invention shows particular advantage for making high gloss glazes of adjustable and low thermal expansion for thermal shock and mechanical shock resistant ceramic whiteware, for example, dinnerware, cookware, ceramic tile, acoustical tiles of the mineral type, sanitary ware, artware, and electrical and technical porcelain. The invention is especially adaptable to conventional "two-fire" glazing practice.

---

This application is a division of copending application Ser. No. 828,783, filed May 28, 1969, now U.S. Pat. 3,565,644 issued on Feb. 23, 1971, which is a continuation-in-part of application Ser. No. 625,000 (now abandoned), filed Mar. 22, 1967, the disclosure of which is incorporated herein by reference.

This invention relates to a composition for glazing ceramic ware with low expansion high gloss glazes, the process for glazing ceramic bodies and substrates with said composition, and the resulting coated ceramic bodies.

Heretofore compositions for glazing ceramic ware with a desirable high gloss glaze have not been available with the extremely low coefficients of thermal expansion possible by using this invention. A particular advantage of this invention is that it is especially adaptable to conventional glazing practice such as the U.S. "two-fire" glazing practice as well as other techniques. The invention is also particularly advantageous for making glazes of adjustable and very low thermal expansion for thermal shock- and/or mechanical shock-resistant ceramic whiteware, for example, dinnerware, cookware, ceramic tile, acoustical tiles of the mineral type, sanitary ware, artware, and electrical and technical porcelain.

In one aspect the invention is a glazing slip composition for glazing low expansion ceramic ware with a high gloss glaze comprising 100 parts of particulate vitrifiable material, at least a substantial fraction of which initially is in the vitreous state, said vitrifiable material, after melting into a fluent vitreous state, being partially devitrifiable and crystallizable into a substantially dimensionally stable, continuous vitreous coating in which are dispersed crystals having average coefficient of thermal expansion less than $4 \times 10^{-6}/°C.$; 0–15 parts ceramic clay (other than a montmorillonite clay); 0–5 parts of a montmorillonite (such as bentonite) as a suspending assistant; 0–20 parts of ceramic colorant or stain; 0–20 parts ceramic opacifier such as zirconia, titania, tin oxide, or cerium oxide; 0–0.4 part electrolyte for suspending, dispersing, peptizing and/or thickening such as calcium chloride, sodium silicate, sodium tetrapyrophosphate, methyl cellulose, and sodium carboxy methyl cellulose; and 0–90 parts water.

Typical water concentration in a resulting slip would be between about 15 and 90 parts per 100 parts of the particulate vitrifiable material, for example, 20–40 parts for a dipping application of the glazing composition; 70–90 parts for roller coat application; and 60–80 parts for spray application. Other forms of application can include waterfall glazing of the ceramic body or substrate, or brushing or blade application of such slip.

The particulate vitrifiable material useful for partially devitrifying or crystallizing into the low expansion, high gloss glaze having a continuous vitreous phase should be at least partially in the vitreous state initially. Suitably at least the water soluble constituents such as carbonates, borax, boric acid, sodium fluoride or potassium fluoride should be combined as vitreous matter so as to resist water solution. It is especially desirable to have no more than one percent by weight of the particulate devitrifiable material extractable in water at room temperature when 100 grams of the material are suspended in 1000 ml. of water. Advantageously, the particulate vitrifiable material is at least 10–15 percent by weight in the vitreous state and even higher to achieve best interaction of all the components in subsequent firing and resulting glazing. For example, the particulate vitrifiable material can be petalite mixed with other materials which are entirely in the vitreous state as a frit or a mixture of frits. Preferably the entire particulate vitrifiable material in the composition other than the listed mill additions is a frit or a mixture of frits. The optional strains, opacifiers, clay, bentonite and other solids can be mixed intimately into the composition as mill additives. Wet grinding of the composition ordinarily is practiced, but the solids can be ground dry if desired, with water added subsequently to the premilled solids to make a slip. To achieve best utility and performance there should be no more than about 3 percent, and preferably no more than about ½ percent of the particles retained on a 325 mesh (Tyler Standard) screen after milling of the composition for application to a ceramic body.

The particularly low average coefficients of thermal expansion of the crystals formed when the particulate vitrifiable material is partially devitrified or crystallized is the basis of the special utility of the instant composition for glazing ceramic ware. These crystals formed in the devitrification should have average thermal expansion less than $4 \times 10^{-6}/°$ C., suitably no more than about $2.5 \times 10^{-6}$ down to about $1 \times 10^{-6}$, or even no measurable coefficient or a slightly negative one such as minus $1 \times 10^{-6}$. Average thermal expansion of a crystal means that the expansion is averaged over all crystallographic directions. These crystals are held in a matrix of continuous vitreous coating to yield a substantially non-porous high gloss glaze over the ceramic substrate. The overall glaze composition after firing should have an overall coefficient of thermal expansion less than $5 \times 10^{-6}/°$ C., advantageously about $1 \times 10^{-6}$ to $$4 \times 10^{6-}/° C.$$

and preferably about $1 \times 10^{-6}$ to $3 \times 10^{-6}/°$ C. The thermal expansion values spoken of in this specification in connection with glazes and bodies are the average linear thermal expansion coefficient of these materials for the temperature range of 50–350° C.

Highly glossy semicrystalline glass ceramic glazes on low expansion ceramic bodies are quite difficult to obtain. Low expansion semicrystalline glazes by definition contain a network of low expansion crystals dispersed in a glossy matrix. It is known that the presence of these crystals tends to result in a dull or matte appearance because the crystalline grain boundaries cause index of refraction gradients and disrupt the light reflectance properties of the glassy matrix.

Accordingly, the composition and optical characteristics of the residual glassy matrix are quite critical to the achievement of a highly glossy glaze. The glassy matrix is comprised primarily of the fluxing components which do not participate in the crystallization of the low expansion lithium aluminosilicates. The glassy matrix also contains residual equilibrium amounts of uncrystallized lithia, alumina and silica.

It has now been discovered that certain fluxing components in specified critical amounts and proportions result in high gloss, low expansion lithium aluminosilicate glazes.

Gloss as used herein refers to the shine or luster of glazed surfaces. Gloss can be evaluated by several standard test methods. One such test is the "Method of Test for 45-Degree Specular Gloss of Ceramic Materials," ASTM Designation C346. This test result is based on the ratio of reflected light to incident at a 45° angle with higher test values indicating glossier surfaces. Another such test is the "Image Gloss Test" described in Porcelain Enamel Institute Bulletin T–20. In this test an image is projected onto the test surface at a given angle. The distinctness of reflected image is then observed and rated with higher ratings indicating the more distinct images. These tests are used in some of the following examples. While these tests are qualitative rather than quantitative in nature, they are able to distinguish between high, moderate and low gloss.

In order to obtain the glazing effectiveness the particulate devitrifiable material must be meltable into a fluent vitreous state of comparatively low viscosity for flowing and spreading onto the ware and giving the glaze film. The particulate vitrifiable material of the composition can be thought of as basically two portions, the portion which in the glazing operation crystallizes or devitrifies to yield the necessary extremely low expansion crystals, and a flux which makes substantially the balance of the material into a continuous vitreous film-forming matrix that resists devitrification under the glazing conditions.

To distinguish the particulate vitrifiable material useful in compounding the composition for glazing from the composition as a whole, which can include various mill additions, said particulate vitrifiable material by itself hereafter will be referred to as a "preparation." In another aspect of this invention particularly useful preparations are set forth which yield upon firing the required fluency for glazing and subsequently are crystallizable or devitrifiable into a dimensionally stable continuous vitreous coating in which are dispersed the very low expansion crystals. The flux (which can be considered a diluent) reacts to make a glass of the preparation in the firing operation, the flux being fully soluble in the fluent melt.

The low expansion crystals formed on the ensuing crystallization or devitrification in the lithium-bearing preparation of this invention are primarily lithium alumno-silicate crystalline structures and can be the stuffed quartz structure as described in the Beall U.S. Pat. 3,252,811, β-eucryptite ($Li_2O \cdot Al_2O_3 \cdot 2SiO_2$) and/or β-spodumene ($Li_2O \cdot Al_2O_3 \cdot 4SiO_2$) (which has a coefficient not as low as that of stuffed quartz and therefore not considered as useful in all aspects of the invention).

The composition of the uncrystallized preparation must be such as to thermally crystallize to the appropriate type and amount of low expansion lithium aluminosilicate phases to form a semicrystalline glaze having a composite or overall thermal expansion coefficient of less than $5 \times 10^{-6}/°$ C. To insure the in situ crystallization of the appropriate lithium aluminosilicate crystalline phases in the glaze, the alumina ($Al_2O_3$) content of the uncrystallized preparation is quite critical.

According to the present invention, the glazing preparations must contain at least 17% by weight of alumina ($Al_2O_3$) to achieve these desired low expansions. When the $Al_2O_3$ content is less than 17% by weight the expansion of the resulting semicrystalline glaze is higher than $5 \times 10^{-6}/°$ C. A minimum of 17% $Al_2O_3$ is therefore required to obtain preparations which are thermally, in situ, autocrystallizable to form low expansion, semicrystalline, glass-ceramic glazes having a coefficient of thermal expansion of less than $5 \times 10^{-6}/°$ C. The thermal expansion of this semicrystalline glaze is a weighted mean of the expansion of the uncrystallized glassy matrix (relatively high expansion) and the expansion of the lithium aluminosilicate crystalline phase (relatively low expansion).

The reason for this unexpected criticality of $Al_2O_3$ is not presently fully understood, although it is suspected that when the $Al_2O_3$ content is less than 17% by weight, The crystallizing vitreous phase becomes alumina deficient as the crystallization progresses, and crystallization of the higher expansion lithium metasilicate ($Li_2O \cdot SiO_2$) and lithium distillate ($Li_2O \cdot 2SiO_2$) crystalline phases occurs at the expense of the low expansion lithium aluminosilicate phases. Regardless of the crystallization mechanism responsible, it can be stated that preparation compositions containing at least 17% by weight of $Al_2O_3$ crystallize to form glazes having thermal expansions of less than $5 \times 10^{-6}/°$ C.

The criticality of this 17 weight percent minimum alumina content of the present glazing preparations will be more fully appreciated in view of the prior art. U.S. Pat. 3,368,712 (Sanford) discloses enameling compositions for metallic substrates. These enameling compositions yield semicrystalline enamels having coefficients of thermal expansion in the range of about $75–110 \times 10^{-7}/°$ C. which are compatible with high expansion metallic substrates such as mild steel. The crystalline phases present are described as lithium titanium silicates having thermal expansion coefficients of about $80–90 \times 10^{-7}/°$ C. This presence of these high expansion crystalline phases result in semicrystalline enamels having coefficients of expansion of 75×10⁻⁷/° C. and higher which is unacceptable for use as a low expansion glaze. For instance, enamels 7, 9 and 11 from Table II of Sanford patent contain about 15–16% alumina. These enamels are unsuitable for use as low expansion whiteware glazes because enamel 7 has a coefficient of expansion of $105 \times 10^{-7}/°$ C., enamel 9 has a coefficient of expansion of $100 \times 10^{-7}/°$ C. and enamel 11 has a coefficient of expansion of $130 \times 10^{-7}/°$ C. All of these expansions are well above the expansion coefficient of $50 \times 10^{-7}/°$ C. provided by the present compositions.

According to another feature of the present invention, it is not necessary to incorporate a nucleant into the preparation to induce the nucleation or growth of the low expansion lithium aluminosilicate crystalline phases during the subsequent heat treatment. The amounts and proportions of $Li_2O$, $Al_2O_3$ and $SiO_2$ in the preparation are specified so that the appropriate low expansion phases are self-nucleating or autocrystallizable under the influence of the energy supplied by the specified heat treatment.

This is an important advantage in the glazing of ceramic whitewares because nucleants often detract from the color and appearance of the finished product. For instance, titania ($TiO_2$) is a commonly employed nucleant in crystallizable glazes. Unfortunately, the presence of this titania nucleant tends to cause an off-white, yellow-brown discoloration in the fired glaze. This yellowish discoloration is undesirable and commercially unacceptable for many whiteware applications. Additionally, titania nucleated glazes are often very low in gloss and have a dull or matte appearance. Self-nucleated glazes of the present invention are bright, white and glossy.

Low expansion lithium aluminosilicate glazes containing titania nucleants have been studied in the past. For instance, see the article "Studies on the Glazes of Lithia Ceramics" by Maki and Tashiro, published in the Journal of the Ceramics Association of Japan, vol. 74, No. 3, pp. 89–93, 1966, wherein a glazing composition containing 50.4% $SiO_2$, 29.2% $Al_2O_3$, 5.9% $Li_2O$, 1.7% $ZrO_2$, 2.6% $P_2O_5$, 2.6% $TiO_2$, 1.0% $Na_2O$, 1.0% $K_2O$, 2.8% $B_2O_3$ and 2.8% PbO is disclosed. While this composition does form a low expansion glaze, the glaze is dull or matte and has a yellow-brown discoloration which is not particularly desirable in whiteware applications where bright, white glossy surfaces are required. When this glazing composition is prepared and applied to a petalite body as disclosed in the article, the titania nucleants immediately form a slight yellow discoloration. This yellow discoloration becomes brownish-yellow under heat treatment specified. Apparently, the nucleation and crystallization mechanism disclosed in this Japanese article is similar to the mechanism disclosed by Stookey in U.S. Pat. 2,920,971, in that the glaze is applied at an elevated temperature (about 1300° C.) and the temperature is lowered to about 600° C. to allow the titania to nucleate submicroscopic crystalline nuclei, and then the temperature is raised to about 750° to 1000° C. to promote crystalline growth to form the semicrystalline ceramic glaze. The present compositions and processes eliminate the need for nucleating agents such as titania and also eliminates the need for the nucleation heat treatment. Accordingly, bright, white (non-yellow), glossy, ceramic whiteware glazes are presently attainable.

The crystalline phases discussed above are identified by X-ray diffraction analysis and accordingly the designation of the crystalline phases as "stuffed quartz," "β-eucryptite" and "β-spodumene" includes low expansion lithium aluminosilicate crystalline phases which are identified as stuffed quartz, β-eucryptite or β-spodumene by X-ray diffraction.

Accordingly, the inventive preparations yielding the resulting low expansion, high gloss glaze containing the aforementioned low expansion crystals can be described as particulate mixtures providing a special resulting ingredient composition set as follows:

| Ingredient— | Percent |
|---|---|
| $Li_2O$ | 0–23. |
| MgO | 0–17, 0.74 part of MgO replacing 1 part of $Li_2O$ when MgO is used, the subtotal sum of $Li_2O$ and MgO being at least 3%. |
| $Al_2O_3$ | 17–50. |
| $SiO_2$ | 36–78, the subtotal sum of the $Li_2O$, MgO, $Al_2O_3$ and $SiO_2$ being 70–95%. |
| $ZrO_2$ | 0–5. |
| Flux | 5–30. | wherein said flux is: $B_2O_3$, $K_2O$, F, PbO, $Na_2O$, CaO, SrO, ZnO, BaO up to 5%, or a mixture of same; the subtotal sum of the $ZrO_2$ plus said flux is 5–30% and wherein the subtotal sum of flux plus MgO includes at least about 65% $K_2O$, $B_2O_3$ and mixtures thereof.

Soda and the Group II metal oxide fluxes mentioned above are detrimental to gloss and their combined total should be maintained below about 35% of the subtotal sum of flux plus MgO.

Advantageously for most practical operation and lower thermal expansion of the resulting glaze the range of ingredients set forth above is restricted as follows:

| Ingredient— | Percent |
|---|---|
| $Li_2O$ | 4–23. |
| MgO | 0–6, 0.74 part of MgO replacing 1 part of $Li_2O$ when MgO is used. |
| $Al_2O_3$ | 17–40. |
| $SiO_2$ | 36–74, the subtotal sum of the $Li_2O$, MgO, $Al_2O_3$ and $SiO_2$ being 80–95%. |
| $ZrO_2$ | 0–5. |
| Flux | 5–20. | wherein the subtotal sum of the $ZrO_2$ plus flux is 5–20%.

Preferably, for obtaining the most practical low expansion, high gloss glazes useful in a wide variety of operations and meeting the many operational requirements in the ceramic industry for cookware and dinnerware manufacture, the foregoing composition range is further restricted as follows:

| Ingredient— | Percent |
|---|---|
| $Li_2O$ | 7–16. |
| MgO | 0–2½, 0.74 part of MgO replacing 1 part of $Li_2O$ when MgO is used. |
| $Al_2O_3$ | 17–33. |
| $SiO_2$ | 48–63, the subtotal sum of the $Li_2O$, MgO, $Al_2O_3$ and $SiO_2$ being 88–95%. |
| $ZrO_2$ | 0–3. |
| Flux | 5–12. | and wherein the subtotal sum of the $ZrO_2$ plus flux is 5–12%.

It will be noted in the above composition sets that zirconia can be added in the proportions specified as a crystallization rate promoter or "catalyst." $ZrO_2$ crystallizes from the glaze as a minor phase in the form of a cubic crystal. In some preparations, particularly those yielding the lower thermal expansion coefficients, the presence of such minor phase yields a less glossy finish, whereas in other preparations, such as those approaching the maximum limit of overall thermal expansion herein, such minor phase imparts some additional glossiness to the resulting fired glaze.

In all instances the ingredients in the foregoing preparations are vitrified to an extent at least sufficient for rendering such preparation substantially water resistant as hereinbefore described (so that application of the preparations to a substrate cannot involve an aqueous leaching away of the necessary interacting materials and resulting disproportionation of the preparation). Because some of the probable reactions that occur upon firing are solid state reactions, extremely intimate and substantially homogenous distribution of the reactants in close proximity to each other certainly is desirable for greatest reaction efficiency. Accordingly, it is advantageous that a substantial fraction of the preparation be in vitreous condition, and preferably that the preparation is a single frit or an intimate mixture of frits to insure intimacy of the interacting components as well as water resistance.

In a further aspect of the invention there is presented a process for glazing a ceramic body with a high gloss glaze which comprises:

(a) at least partially coating the body with a composition for glazing of the type described herein;
(b) firing the resulting coated body at a temperature sufficiently high and for a time sufficiently long for converting said composition into a fluent, continuous, vitreous surface coating;
(c) then adjusting temperature to a value at which crystal growth in said vitreous surface coating occurs within not substantially more than several hours;
(d) then cooling the resultant glazed ware at a rate consistent with keeping the ware integral.

As an advantageous embodiment of this process the firing is performed at a temperature not substantially more than about 500° C. above the liquidus of the composition for glazing to suppress a generally undesirable irregular effect known as "orange peeling" and to yield a smooth glaze without such surface irregularities. In most instances the firing temperature will be about 100–300° C. or so above the liquidus of the composition for glazing. At the liquidus crystals can be present which prevent the necessary fluidity. The instantaneous fluid viscosity of the composition during the firing step shall be less than the softening point (as defined by the conventional ASTM procedure applied to glasses) which viscosity at softening point is about $10^{7.6}$ poises. A useful firing temperature for these lithium aluminosilicates is from about 975–1200° C.

The most practical procedure for adjusting temperature to a value at which crystal growth in the fluent vitreous coating occurs in a practical time, that is, in several minutes to at least within several hours, is to reduce the temperature after the firing step to a temperature below the liquidus of the highest melting crystals to be produced in the resulting vitreous matrix, although in some systems the temperature conceivably could be raised to obtain devitrification at the desired rate of crystal growth. As a practical matter the temperature range for inducing crystal growth is at about 650–680° C. For each particular preparation and mill additions thereto it should be understood however, that there will be optimum temperatures to achieve this devitrification at a desired practical rate in a time not substantially more than several, i.e., 20–30 hours, and usually in a much shorter overall time, e.g., as little as 8–10 minutes, to accommodate rapid production of glazed ware.

The final step in the glazing process is to cool at a rate that is not so fast as to cause undesirable cracking or crazing or undesirable strains in the resulting glazed object or its glazed surface, in other words, at a rate consistent with keeping the ware integral. The cooling can be done reasonably fast for production purposes, some systems being air-coolable from a temperature as high as about 816° C. to room temperature with the coated work merely maintained on a metal support. A practical rate of cooling is one to ten degrees C. per minute, and the cooling can be quite slow where long cooling times can be accommodated.

The instant invention is to be distinguished from conventional operations for making semi-crystalline glazes for artistic purposes because such conventional glazes contain crystals having average coefficient of thermal expansion above $4 \times 10^{-6}/°$ C. Such glazes are not useful for the high gloss glazing high petalite or cordierite bodies or other bodies of similarly low thermal expansion.

Furthermore, the instant invention is to be distinguished from the conventional preparation of devitrified glass bodies typified by the well-known Pyroceram product and related processes (the term "Pyroceram" being a trademark of Corning Glass Works). Typically, in the preparation of such devitrified glass forms, the formulation and operation is directed to induce crystallization in glass at a fairly low temperature so as to maintain dimensional stability of the form. Practically a minimum viscosity of $10^9$ poises is required; preferably a minimum viscosity of $10^{11}$ poises should be used. In contrast the present invention is directed to obtain working fluency of the molten devitrifiable material so it will coat a body efficiently, the viscosity in this condition being typically several powers of 10 less than the glass in the conventional glass devitrifying operation. Fluid viscosity of a typical inventive composition at useful firing temperatures was measured at between $10^5$ and $10^6$ poises using the concentric cylinder method (R. A. Eppler, J. Am. Cer. Soc., 49(12):679, December 1966).

As stated before, the instant particulate vitrifiable material in the composition for glazing must have at least a substantial fraction already in the vitreous state to obtain the desired interaction for the instant operation, and the most practical way to achieve the glazing is to heat the instant bisque coating beyond the liquidus of any crystals present, then reduce temperature for the crystal growing step. In contrast, the normal heating path for making low expansion devitrified bodies, e.g., as shown in U.S. Pats. 3,006,775; 3,252,811; 2,920,921; 3,161,528 and 3,272,610, is to make a glass body in the conventional sense, the body being formed in desired shape so that it is extremely highly viscous and dimensionally stable, give it a comparatively low temperature nucleating "soak" to maximize the viscosity within the body, then raise the temperature of the body to a temperature which is below the liquidus of the crystals being formed. U.S. Pat. 3,084,053 first converts the glass to frit, aggregates the frit into desired shape, then treats similarly. For some unexplained reason this type of heat treatment does not favor the formation of highly glossy glazes.

The most suitable compositions for glazing according to this process are those containing particulate vitrifiable material, within the composition range set forth above, which is made up so as to be substantially entirely in the vitreous state as frit particles.

The coating step preparatory to firing of the coated ceramic body can be done as previously described in connection with the composition for glazing, above, by spraying, dipping, and other conventional techniques. In its unfired condition the thus coated ware can be considered as being in the bisque condition. The conventional two-fire system is to make the body, fire it at some high temperature, cool it, then apply the glazing material, and refire at a lower temperature than that at which the body was fired. Other practices include that of coating the unfired (green) body and firing the glaze and body simultaneously. In some instances manufacturers have found it desirable to form the body, fire it only to dryness at some low temperature, then apply the glaze and fire the coated body at a higher temperature. Hence, for my purpose, the body can be preformed and fired, or green, or merely dried before application of the glaze, although the two-fire system is used most generally in the U.S., is the most demanding on compositions for glazing; and the instant invention is specially suited for such system.

Particularly useful ceramic bodies for my glazing process and for making the resulting glazed article are those compounded with various low expansion ceramic materials to give such body a thermal expansion coefficient between about $1\times 10^{-7}/°$ C. and about $60\times 10^{-7}/°$ C. and preferably between about $5\times 10^{-7}/°$ C. and about $20\times 10^{-7}/°$ C. For glazing of such body the overall coefficient of thermal expansion of the instant compositions for glazing should be at least as low as the body to prevent crazing, advantageously about $10\times 10^{-7}/°$ C. lower than the body; for compression glazing this differential most desirably is $20\times 10^{-7}/°$ C. to $40\times 10^{-7}/°$ C., the body being higher in expansion. Accordingly, the particular glaze composition utilized here should be matched to the body in differential of coefficient of thermal expansion, the differential being in any case measured at the intended use temperature or over the use temperature range of the resulting glazed ware. For cookware thermal shock rsistance is most desired over the operating temperature range of said ware. For dinnerware, compression glazing most desirably is practiced for obtaining mechanical shock resistance at ordinary room temperatures and dishwashing temperatures. Selection of the instant glaze for the appropriate body to get a combination of thermal shock resistance and mechanical shock resistance is, of course, quite possible within the limits of this invention.

Minerals generally used in making up the bodies are petalite, cordierite, zircon sillimanite, low expansion fire clays and/or wollastonite. Most suitable bodies for the instant purpose are those containing at least about 25% by weight of a lithia-bearing ceramic mineral such as petalite or a body containing at least about 50% cordierite so that the body has desired low expansion properties. Typical bodies can be compounded for high compression glazing having as a primary phase petalite, or talc (to produce a substantial cordierite phase) or a zircon, or sillimanite (to produce a mullite phase) or a combination with feldspars, clay, flint and/or silica. Bodies containing a high proportion of wollastonite also can be glazed suitably using glazes that fire at a temperature lower than that used in previously proposed glazing practice for this material (approaching 1200–1300° C.), this being a definite advantage of applying the principles of the invention to wollastonite glazing practice.

Basically, to obtain the lowest expansion glaze, only enough flux is used to obtain the desired continuous vitreous surface which is adequately flowable into a coating film during the firing step, this minimum proportion of flux being as low as about 5% for some of the lithia-containing preparations, and at least about 7% in the most practical preparations described herein. In these low flux compositions high gloss is ordinarily most difficult to achieve because of the low amount of residual glassy matrix. Nevertheless, high gloss is developed in these low flux compositions by the present invention. The upper limitation of the flux content on the preparation is determined by the overall thermal expansion coefficient of of the composite glaze. Typical coefficients of thermal expansion relative to flux content for the instant lithium-based preparations are as follows: 12% flux gives about $20\times 10^{-7}/°$ C.; 16% flux about $30\times 10^{-7}/°$ C.; 20% flux about $40\times 10^{-7}/°$ C. The maximum flux content in any useful case with such preparations is about 30%, and in some instances it must be less to keep within the necessary limits of thermal expansion.

Raw materials for providing the ingredients of the preparations are those conventional in the glass makers' art for supplying silica, alumina, and the other metal oxides for glass. The ingredients are provided alone or combined in various ways in minerals and chemicals. Purity of the raw materials mainly affects color of the glaze, thus the purer raw materials are more versatile.

The flux can be a single material, but most generally is a mixture or combination for efficiency or economy. The compositions for glazing can be made boron-free, but $B_2O_3$ is advantageous to make the glaze most spreadable and fluent. Similarly, potassium oxide is desirable to promote gloss. The preferred flux is an approximately 50/50 mixture by weight of $B_2O_3$ and $K_2O$. The use of alkali metal oxides tend to raise the coefficient of thermal expansion of the vitreous phase in the resulting glaze. Flux materials that can be used include: $B_2O_3$—suitably in the form of borax, boric acid and/or calcium borate; $K_2O$—suitably in the form of potassium nitrate and/or potassium carbonate; F—suitably in the form of calcium fluoride, potassium silica fluoride, cryolite, sodium fluoride and/or potassium fluoride; PbO—suitably in the form of litharge and/or red lead ($Pb_3O_4$); soda—suitably in the form of sodium nitrate, sodium carbonate, borax, feldspar and/or sodium fluoride; CaO—suitably in the form of whiting (calcium carbonate), calcium fluoride, wollastonite, and/or calcium feldspar; SrO—suitably in the form of strontium carbonate; and ZnO—suitably in this oxide form. The zirconia in the preparations can be added as such or, more commonly, as zircon ($ZrSiO_4$).

For optimum high gloss the flux is $B_2O_3$, $K_2O$, and mixtures thereof; and no other fluxes are present. The presence of Group II metal oxides and $Na_2O$ tends to detract from gloss and their presence is to be avoided. For instance, the presence of MgO (a Group II metal oxide), even though it participates in the crystallization of the low expansion crystalline phases, tends to lower the gloss. Accordingly, for optimum gloss the flux is $B_2O_3$, $K_2O$, F, PbO, $Na_2O$, CaO, SiO, ZrO and BaO or a mixture of same; the subtotal sum of the $ZrO_2$ plus said flux is 5–30%, and wherein the subtotal sum of flux plus MgO comprises at least about 65% $K_2O$, $B_2O_3$ and mixtures thereof.

The following examples show various ways in which the invention has been practiced, but should not be construed as limiting the invention. All temperatures are shown in degrees centigrade. In this specification all parts are parts by weight and all percentages are weight percentages unless otherwise expressly indicated.

EXAMPLE 1

The following raw materials were weighed out and mixed in a twin-shell blender:

|  | Parts |
|---|---|
| Potassium nitrate | 313 |
| Boric acid | 267 |
| Lithium carbonate | 441 |
| Calcined alumina | 446 |
| Petalite | 2129 |

The batch was placed in a fireclay crucible and smelted in an electric furnace at 1430° C. for 6 hours. It was then poured into water to frit it and the frit allowed to dry. The frit then had the following composition:

|  | Percent |
|---|---|
| SiO | 53.9 |
| $Al_2O_3$ | 27.0 |
| $Li_2O$ | 9.1 |
| $B_2O_3$ | 5.0 |
| $K_2O$ | 5.0 |

The frit was then dried and ball-milled for 16 hours. Subsequently, 100 parts of the ball-milled frit, 0.2 part bentonite, 4 parts kaolin clay and 40 parts water were ball-milled together for one hour and the mixture sprayed onto a bisque-fired body of the following composition:

|  | Percent |
|---|---|
| Petalite | 50 |
| Potash spar | 10 |
| Ball clay | 25 |
| Kaolin | 15 |

The body had been bisqued at 1260° and the coating was applied to a wet weight of one-half to one gram per square inch of body.

The glaze was then autocrystallized by firing the coated body as follows: heated at 500°/hr. to 975°; held one hour; cooled 180°/hr. to 750°; held one-half hour; cooled 180°/hr. to room temperature.

The result was a bright, high gloss, white, craze-free, continuous, non-porous, semicrystalline glaze coating on the tile body. In this glaze the subtotal content of flux plus MgO was 10% of the overall frit composition (there was no $ZrO_2$ present), and the combined percentage of $B_2O_3$ plus $K_2O$ was 100% of the flux plus MgO content. The result was a high gloss glaze. The body itself had a coefficient of thermal expansion of $17.7 \times 10^{-7}/°C.$, and the corresponding coefficient of the coating was even lower in order to stay integral with such low expansion body.

EXAMPLE 2

The same kind of composition for glazing was sprayed onto the same kind of ceramic body as used in Example 1. The coated body then was fired at 1040° for 12 minutes in accordance with the Orth fast-fire process and apparatus shown in U.S. Pat. 3,322,413. The fired object was removed from the fast-fire furnace and allowed to cool in air. The result was a high gloss tile with a smooth, craze-free, non-porous, translucent, semicrystalline glaze coating.

EXAMPLE 3

The following raw materials were weighed out and mixed:

|  | Parts |
| --- | --- |
| Potassium nitrate | 248 |
| Boric acid | 214 |
| Lithium carbonate | 441 |
| Calcined alumina | 446 |
| Magnesia | 61.2 |
| Petalite | 2129 |

The batch was placed in a fireclay crucible and smelted in an electric furnace at 1430° C. for 6 hours. It was then poured into water to frit it and the frit allowed to dry. The frit then had the following composition:

|  | Percent |
| --- | --- |
| $SiO_2$ | 54 |
| $Al_2O_3$ | 27 |
| $Li_2O$ | 9 |
| MgO | 2 |
| $B_2O_3$ | 4 |
| $K_2O$ | 4 |

The frit was then dried and ball-milled for 16 hours. Subsequently, 100 parts of the ball-milled frit, 4 parts bentonite, and 45 parts water were ball-milled together for one hour and the mixture sprayed onto a bisque-fired body of the following composition.

|  | Percent |
| --- | --- |
| Uncalcined kaolin clay | 36.7 |
| Talc | 20.4 |
| Barium carbonate | 6.2 |
| Calcined kaolin clay | 36.7 |

The body had been bisqued at 1340° and the coating was applied to a weight of one-half to one gram per square inch of body.

The coated body then was fired as follows: heated at furnace rate (approximately 2 hours) to 1100°; held 2 hours; cooled in the furnace (approximately 10 hours) to room temperature.

In this glaze the subtotal content of fluxes plus MgO was 10% of the overall frit composition (there was no $ZrO_2$ present). The combined percentage of $B_2O_3+K_2O$ was 80% of the fluxes plus MgO content.

The result was a moderate gloss, craze-free, non-porous glaze coating on the tile body.

EXAMPLE 4

The following raw materials were weighed out and mixed:

|  | Parts |
| --- | --- |
| Boric acid | 89 |
| Calcined alumina | 93 |
| $KNO_3$ | 104 |
| $Li_2CO_3$ | 139 |
| Petalite | 769 |

The batch was placed in a fireclay crucible and smelted in an electric furnace at 1430° C. for 6 hours. It was then poured into water to frit it and the frit allowed to dry. The frit then had the following composition:

|  | Percent |
| --- | --- |
| $Li_2O$ | 9 |
| $Al_2O_3$ | 22.5 |
| $SiO_2$ | 58.5 |
| $B_2O_3$ | 5 |
| $K_2O$ | 5 |

The frit was then dried and ball-milled for 16 hours. Subsequently, 100 parts of the ball-milled frit and 65 parts of water were ball-milled together for one hour and the mixture sprayed onto a bisque-fired body of the following composition:

|  | Percent |
| --- | --- |
| Wollastonite | 55 |
| Kaolin | 30 |
| Nepheline syenite | 15 |

The body had been bisqued at 1065° and the coating was applied to a weight of one-half to one gram per square inch of body.

The coating on the body was then autocrystallized by firing as follows: heating at 500°/hr. to 975°; holding 2 hours; cooling at 180°/hr. to 750°; holding one hour; and cooling (furnace rate) to room temperature.

In this glaze the combined content of fluxes plus MgO was 10% of the overall frit composition (there was no $ZrO_2$ content). The combined percentage of $B_2O_3+K_2O$ was 100% of the fluxes plus MgO content.

The result was a white, glossy, translucent, smooth, non-crazed, non-porous semi-crystalline glaze coating on the tile body.

EXAMPLE 5

The following two batches were weighed out and mixed separately from each other.

|  | Parts of— | |
| --- | --- | --- |
|  | A | B |
| $KNO_3$ | 313 | 314 |
| Boric acid | 267 | 0 |
| $Li_2CO_3$ | 622 | 453 |
| Milled zircon | 0 | 223 |
| Calcined alumina | 546 | 463 |
| Petalite | 1,952 | 2,036 |

Each batch was placed in a crucible and smelted in an electric furnace at 1430° for 6 hours. Each batch was then fritted in water and dried. The frits then had the following compositions:

|  | Percent of— | |
| --- | --- | --- |
|  | A | B |
| $Li_2O$ | 11.25 | 9 |
| $Al_2O_3$ | 29.25 | 27 |
| $SiO_2$ | 49.5 | 54 |
| $B_2O_3$ | 5 | 0 |
| $K_2O$ | 5 | 5 |
| $ZrO_2$ | 0 | 5 |

The frits then were dried and ball-milled for 16 hours. Subsequently, 50 parts of milled frit A and milled frit B, one-half part bentonite, and 60 parts water were ball-milled together for one hour and the mixture sprayed onto a body like that described in Example 1. The coated body then was fired in the manner described in Example 3.

The result was a white, opaque glaze of moderate gloss, free of crazing and non-porous. In this glaze the subtotal content of fluxes plus MgO was 7.5% of the overall frit composition. The combined percentage of $B_2O_3$ plus $K_2O$ was 75% of the combined fluxes, $ZrO_2$ and MgO. The gloss was moderate because the combined content of flux plus MgO was only 7.5%. Accordingly, there is less residual vitreous matrix available for providing gloss.

EXAMPLE 6

A composition like A of Example 5 was prepared and fritted in the manner of Example 5. Then 100 parts of this ball-milled frit, 5 parts of minus 325 mesh silica, 4 parts bentonite, and 60 parts of water were ball-milled together for one hour, and the mixture sprayed at the application weight of one-half to one gram per square inch onto a bisque-fired body (1260°) of the following composition:

| | Percent |
|---|---|
| Petalite | 56 |
| Potash spar | 10 |
| Ball clay | 22 |
| Kaolin | 12 |

The coated body was fast-fired at 1150° for one hour in the manner of Example 2 and allowed to cool in air.

The result was a yellow, opaque glaze free of crazing, non-porous and glossy. In this glaze the subtotal content of the fluxes plus MgO was 10% of the overall frit composition. (There was no $ZrO_2$ present.) The combined percentage of $B_2O_3$ plus $K_2O$ was 100% of the combined fluxes plus MgO content.

EXAMPLE 7

The following raw materials were mixed:

| | Parts |
|---|---|
| Boric acid | 401 |
| Calcined alumina | 144 |
| $KNO_3$ | 180 |
| $Li_2CO_3$ | 715 |
| Petalite | 2126 |
| $K_2SiF_6$ | 149 |

The batch was placed in a fireclay crucible and smelted in an eletcric furnace at 1430° C. for 6 hours. It was then poured into water to frit it and the frit allowed to dry. The frit then had the following composition:

| | Percent |
|---|---|
| $Li_2O$ | 12.75 |
| $Al_2O_3$ | 17 |
| $SiO_2$ | 55.25 |
| $B_2O_3$ | 7.5 |
| $K_2O$ | 5 |
| F | 2.5 |

The frit was dried and ball-milled for 16 hours. One hundred (100) parts of it were mixed with 65 parts water and ball-milled for another hour. The mixture was sprayed onto a bisque-fired (1260°) body at a weight of one-half to one gram per square inch of body. The body composition was:

| | Percent |
|---|---|
| Petalite | 30 |
| $SiO_2$ | 15 |
| Potash spar | 15 |
| Ball clay | 25 |
| Kaolin | 15 |

The coated body was fired as follows: heated at 500°/hr. to 975°; held one hour; cooled at 180°/hr. to 700°; held one hour; cooled at 180°/hr. to room temperature.

The result was a glossy, translucent, uncrazed, non-porous glaze coating on the tile body. In this glaze the combined percentage of fluxes plus MgO was 10% of the overall frit composition. (There was no $ZrO_2$ present.) The combined percentage of $K_2O$ plus $B_2O_3$ was 7.5% of the flux plus MgO content.

EXAMPLES 8–18

Raw materials listed in Table I, below, were separately weighed out and mixed. Each batch was placed in a crucible and smelted and fritted as in Example 1. Each frit then had the composition given in Table II. Each frit then was dried and ball-milled for 16 hours. Subsequently, 100 parts of each frit were mixed with 4 parts bentonite and 40 parts water. Each such resulting slip was ball-milled for one hour more, then sprayed onto the bodies listed in Table III. Firing, crystal development, and cooling to room temperature was done as in Example 3. The results are tabulated in Table IV.

EXAMPLES 19–22

Conventional batch materials were smelted and fritted as in Example 1 to yield the frit composition presented below. Each frit was then dried and ball-milled for 16 hours. Subsequently, 100 parts of each frit were mixed with 4 parts of bentonite and 40 parts of water. Each such resulting slip was ball-milled for one hour more, then sprayed onto ceramic bodies similar in composition to those described in Example 1. Firing, crystallization, and cooling to room temperature was done as in Example 3. The results are set forth below.

This data shows that the gloss of the resulting glaze as determined by the Image Gloss test, the 45° light reflectance test and visual observation is consistently higher in those samples having the combined percentages of $K_2O$ plus $B_2O_3$ at a minimum of 65% of the total content of fluxes plus MgO. Furthermore, the combined percentage of Group II metal oxides plus $Na_2O$ is less than 35% of the total content of fluxes plus MgO.

| | Percent of— | | | |
|---|---|---|---|---|
| Example | 19 | 20 | 21 | 22 |
| Component: | | | | |
| $SiO_2$ | 55.0 | 55.0 | 55.0 | 54.0 |
| $Al_2O_3$ | 26.2 | 26.2 | 26.2 | 27.0 |
| $Li_2O$ | 9.5 | 9.5 | 9.5 | 9.0 |
| MgO | | | | 2.0 |
| $ZrO_2$ | 2.3 | 2.3 | 2.3 | |
| (Fluxes): | | | | |
| $B_2O_3$ | 2.3 | 2.3 | 2.3 | 5.0 |
| $K_2O$ | 2.7 | 2.7 | 4.7 | 1.0 |
| CaO | 2.0 | 2.0 | | |
| BaO | | | | 1.0 |
| ZnO | | | | 1.0 |
| Subtotal content of fluxes plus MgO as a percentage of the overall frit composition | 7.0 | 7.0 | 7.0 | 10.0 |
| Combined $B_2O_3$ plus $K_2O$ as a percentage of fluxes plus MgO content | 71.5 | 71.5 | 100 | 60.0 |
| Combined Group II metal oxides plus $Na_2O$ as a percentage of fluxes plus MgO content | 29.5 | 29.5 | | 40.0 |
| Glazing conditions: | | | | |
| Time (hours) | 1 | 2 | 2 | 1 |
| Temperature (° C.) | 1,080 | 1,090 | 1,010 | 1,080 |
| Gloss tests: | | | | |
| Image gloss | 8 | 8 | 9. | 4 |
| Percent reflectance (45° incident light angle) | 34 | 26 | 19 | 13 |
| Visual observation of gloss | High | High | High | Low |

TABLE I.—RAW MATERIAL BATCHES

| Raw materials: | Batch, parts | | | | | | | | | | |
|---|---|---|---|---|---|---|---|---|---|---|---|
| | C | D | E | F | G | H | I | J | K | L | M |
| KNO₃ | 313 | 142 | 248 | | 313 | 313 | 313 | 313 | 313 | 314 | 314 |
| Boric acid | 267 | 214 | 214 | 267 | | | | | | | 267 |
| Calcined alumina | 622 | 447 | 441 | 442 | 442 | 442 | 442 | 442 | 442 | 453 | 453 |
| Petalite | 546 | 454 | 446 | 446 | 446 | 446 | 446 | 446 | 469 | 463 | 311 |
| K₂SiF₆ | 1,952 | 2,087 | 2,129 | 2,129 | 2,129 | 2,129 | 2,129 | 2,129 | 2,229 | 2,036 | 2,036 |
| SrCO₃ | | 119 | | | | | | | | | |
| NaNO₃ | | | 91.5 | 413 | | | | | | | |
| MgO | | | | | 153 | | | | | | |
| Whiting | | | | | | 275 | | | | | |
| ZnO | | | | | | | 160 | | | | |
| CdO | | | | | | | | 150 | | | |
| BaCO₃ | | | | | | | | | 195 | 223 | 223 |
| Zircon | | | | | | | | | | | |

TABLE II.—OXIDE COMPOSITIONS

| | Batch digestion, weight percent | | | | | | | | | | |
|---|---|---|---|---|---|---|---|---|---|---|---|
| | C | D | E | F | G | H | I | J | K | L | M |
| Li₂O | | 11.25 | 9 | 9 | 9 | 9 | 9 | 9 | 9 | 9 | 9 |
| MgO | | | | | 5 | | | | | | |
| Al₂O₃ | 29.25 | 27 | 27 | 27 | 27 | 27 | 27 | 27 | 27 | 27 | 22 |
| SiO₂ | 49.5 | 54 | 54 | 54 | 54 | 54 | 54 | 54 | 54 | 54 | 54 |
| B₂O₃ | 5 | 4 | 4 | 4 | 5 | 5 | 5 | 5 | 5 | 5 | 5 |
| K₂O | 5 | 4 | 4 | 4 | 5 | 5 | 5 | 5 | 5 | 5 | 5 |
| F | 5 | 4 | 4 | 4 | | | | | | | |
| SrO | | 2 | | | | | | | | | |
| Na₂O | | | 2 | 5 | | | | | | | |
| CaO | | | | | | 5 | | | | | |
| ZnO | | | | | | | 5 | | | | |
| CdO | | | | | | | | 5 | | | |
| BaO | | | | | | | | | 5 | 5 | 5 |
| ZrO₂ | | | | | | | | | | | |

TABLE III.—BODY COMPOSITION USED

| | Example number | | | | | | | | | | |
|---|---|---|---|---|---|---|---|---|---|---|---|
| | 8 | 9 | 10 | 11 | 12 | 13 | 14 | 15 | 16 | 17 | 18 |
| Composition: Same as Example | 1 | 3 | 1 | 1 | 1 | 1 | 3 | 3 | 3 | 1 | 3 |

TABLE IV.—RESULTS

| | Frit (from Table II) | | | | | | | | | | |
|---|---|---|---|---|---|---|---|---|---|---|---|
| Body number (from Table III) | C | D | E | F | G | H | I | J | K | L | M |
| | 8 | 9 | 10 | 11 | 12 | 13 | 14 | 15 | 16 | 17 | 18 |
| Characteristics: | | | | | | | | | | | |
| Gloss | Moderate | Glossy | Low gloss | Dead matte | Dead matte | Low gloss | Low gloss | Matte | Matte | Matte | High |
| Percent reflectance (45° incident light angle) | | | | 3.2 | 3.2 | 3.0 | 3.0 | | 2.6 | | |
| Image | Opaque | Clear | Translucent | Opaque | Opaque | Opaque | Opaque | Opaque | Opaque | Opaque | Opaque |
| Opacity | White | Brown | White | Creamy | White | Creamy | Creamy | Yellow | Creamy | White | White |
| Color | Smooth | Smooth | Smooth | Matte | Matte | Smooth | Smooth | Somewhat rippled | Matte | Smooth | Smooth |
| Surface condition | No | No | No | No | No | No | No | No | No | No | No |
| Crazing | No | No | No | No | No | No | No | No | No | No | No |
| Porosity | −8.0 | 11.0 | 19.9 | 20.8 | | 31.4 | 10.0 | | 15.8 | 27.9 |
| Average coeff. of thermal expansion over the range of 50–350° ×10⁻⁷/° C | 10 | 10 | 10 | 10 | 10 | 10 | 10 | 10 | 10 | 5 | 10 |
| Subtotal content of fluxes plus MgO as a percentage of the overall frit composition | 100 | 0 | 80 | 50 | 50 | 50 | 50 | 50 | 50 | 100 | 100 |
| Combined B₂O₃ plus K₂O as a percentage of flux plus MgO content | 0 | 0 | 20 | 50 | 50 | 50 | 50 | 50 | 50 | 0 | 0 |
| Combined Group II metal oxides plus Na₂O as a percentage of flux plus MgO content | | | | | | | | | | | |

Having thus described the invention, what is claimed is:

1. In the method for glazing a fired ceramic body by the two-fire process with a high gloss glaze coating having a coefficient of thermal expansion of less than $5 \times 10^{-6}/°$ C. wherein said body is coated with a thermally autocrystallizable lithium aluminosilicate glazing composition containing fluxing components and said coated body is subsequently heat treated to crystallize low expansion lithium aluminosilicate phases; the improvement whereby said glaze coating is provided with a highly glossy surface comprising the steps of:

applying a glaze comprising a ceramic frit consisting essentially of composition in the weight percentage range of:

| Ingredient— | Percentage |
| --- | --- |
| $Li_2O$ | 4–23. |
| MgO | 0–6, 0.74 part of MgO replacing 1 part $Li_2O$ when MgO is used, but a minumum of 4% of $Li_2O$ being present. |
| $Al_2O_3$ | 17–40. |
| $SiO_2$ | 36–74, the subtotal sum of $Li_2O$, MgO, $Al_2O_3$ and $SiO_2$ being 80–95%. |
| $ZrO_2$ | 0–5. |
| Flux | 5–20. | wherein said flux is selected from the group consisting of $B_2O_3$, $K_2O$, F, PbO, $Na_2O$, CaO, SrO, ZnO, BaO up to 5%, or a mixture of same; the subtotal sum of $ZrO_2$ plus said flux is 5–20% and wherein the subtotal sum of flux plus MgO comprises at least about 65% $K_2O$, $B_2O_3$ and mixtures thereof;

firing the resulting coated body at a temperature sufficiently high and for a time sufficiently long for converting said composition into a fluent, continuous vitreous surface coating;

lowering the temperature to a value to effect the in-situ growth of low expansion lithium aluminosilicate crystalline phases in a glassy matrix of residual fluxing components;

and cooling the resulting glazed ceramic body at a rate consistent with keeping the body integral to form a high gloss glaze coating thereon.

2. The method of claim 1 wherein said frit has the composition:

| Ingredient— | Percentage |
| --- | --- |
| $Li_2O$ | 7–16. |
| MgO | 0–2½, 0.74 part of MgO replacing 1 part of $Li_2O$ when MgO is used, but a minimum of 7% $Li_2O$ being present. |
| $Al_2O_3$ | 17–33. |
| $SiO_2$ | 48–63, the subtotal sum of the $Li_2O$, MgO, $Al_2O_3$ and $SiO_2$ being 88–95%. |
| $ZrO_2$ | 0.3. |
| Flux | 5–12. | and wherein the subtotal sum of the $ZrO_2$ plus flux is 5–12%.

3. In a fired ceramic body having a fired glaze frit coating thereon said body having been fired prior to the application of the glaze frit coating, said coating comprising a low expansion non-porous, semicrystalline glass ceramic, high gloss, glaze coating, said coating having a coefficient of thermal expansion of less than $5 \times 10^{-6}/°$ C. the improvement wherein said glaze frit consists essentially of:

| Ingredient— | Percentage |
| --- | --- |
| $Li_2O$ | 4–23. |
| MgO | 0–6, 0.74 part of MgO replacing 1 part $Li_2O$ when MgO is used, but a minimum of 4% of $Li_2O$ being present. |
| $Al_2O_3$ | 17–40. |
| $SiO_2$ | 36–74, the subtotal sum of $Li_2O$, MgO, $Al_2O_3$ and $SiO_2$ being 80–95%. |
| $ZrO_2$ | 0–5. |
| Flux | 5–20. | wherein said flux is selected from the group consisting of $B_2O_3$, $K_2O$, F, PbO, $Na_2O$, CaO, SrO, ZnO, BaO up to 5%, or a mixture of same; the subtotal sum of $ZrO_2$ plus said flux is 5–20% and wherein the subtotal sum of flux plus MgO comprises at least about 65% $K_2O$, $B_2O_3$ and mixtures thereof.

4. As an article of manufacture a low expansion ceramic body having a high gloss glaze coating thereon in accordance with the process of claim 3.

References Cited
UNITED STATES PATENTS

| | | | |
| --- | --- | --- | --- |
| 3,499,787 | 3/1970 | Inoue | 117—125 X |
| 3,463,647 | 8/1969 | Kosiorek et al. | 117—125 X |
| 3,404,027 | 10/1968 | Kosiorek | 117—125 X |
| 3,501,321 | 3/1970 | Margola | 117—125 X |
| 3,532,524 | 10/1970 | Petticrew | 117—125 X |
| 3,380,838 | 4/1968 | Sack | 106—48 X |

WILLIAM D. MARTIN, Primary Examiner

M. R. LUSIGNAN, Assistant Examiner

U.S. Cl. X.R.

117—169 A

PO-1050
(5/69)

UNITED STATES PATENT OFFICE
CERTIFICATE OF CORRECTION

Patent No. 3,676,204          Dated July 11, 1972

Inventor(s) Richard Andrew EPPLER

It is certified that error appears in the above-identified patent and that said Letters Patent are hereby corrected as shown below:

Column 1, line 17, "blazing" should read --glazing--;

Column 2, line 61, "strains" should read --stains--;

Column 3, line 21, "overal" should read --overall--;

Column 3, line 25, "4 X $10^{6-}$/°C." should read --4 X $10^{-6}$/°C.--;

Column 4, line 57, "distillate" should read --disilicate--;

Column 7, line 56, "680°" should read --850°--;

Column 9, line 17, "rsistance" should read --resistance--;

Column 9, line 35, "or a" should read --in--;

Column 9, line 55, "of" - first occurrence should be deleted;

Column 10, line 2, "tend" should read --tends--;

Column 10, line 53, "SiO" should read --$SiO_2$--;

Column 13, line 35, and Column 13, line 36, these lines should read --non-porous and glossy. In this glaze the subtotal content of the fluxes plus MgO was 10% of the overall frit com- --;

Column 15, Table I, under Column "K" of the Table, the numbers "469" and "2,229" should read --446-- and --2,129--, respectively;

Column 15, Table II, to the right of "$Li_2O$" under Column "D" of the Table, the number --9-- should be inserted;

Column 15, Table II, to the right of "$B_2O_3$" under Column "M" of the Table, the number --5-- should be inserted;

PO-1050
(5/69)

UNITED STATES PATENT OFFICE
CERTIFICATE OF CORRECTION

Patent No. 3,676,204           Dated July 11, 1972

Inventor(s) Richard Andrew EPPLER     - 2 -

It is certified that error appears in the above-identified patent and that said Letters Patent are hereby corrected as shown below:

continued.....

Column 16, Table IV, in the first column of the Table, "Image" should read --Image Gloss--;

Column 17, line 20, "minumum" should read --minimum--.

Signed and sealed this 6th day of February 1973.

(SEAL)
Attest:

EDWARD M. FLETCHER, JR.            ROBERT GOTTSCHALK
Attesting Officer                   Commissioner of Patents